Aug. 30, 1927.
P. A. ENGLE
1,641,070
SCALE
Filed Feb. 4, 1926
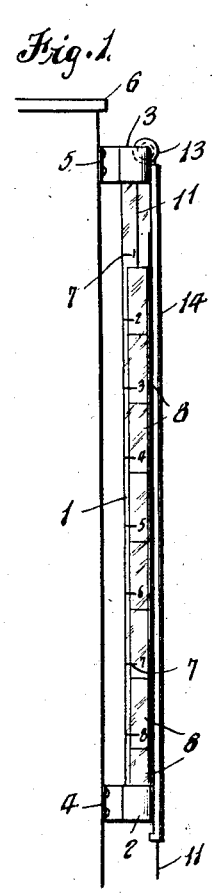
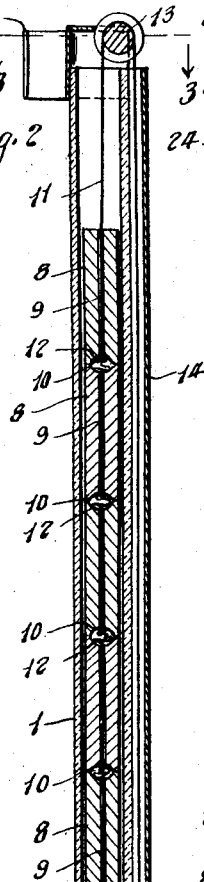
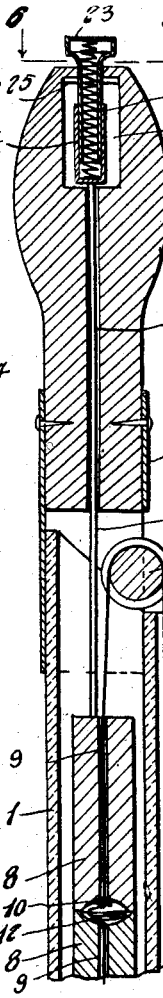
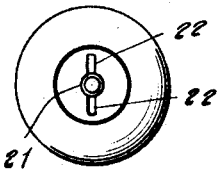
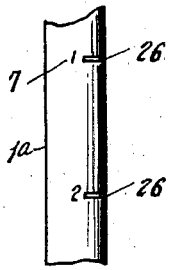
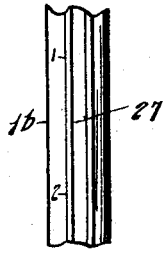
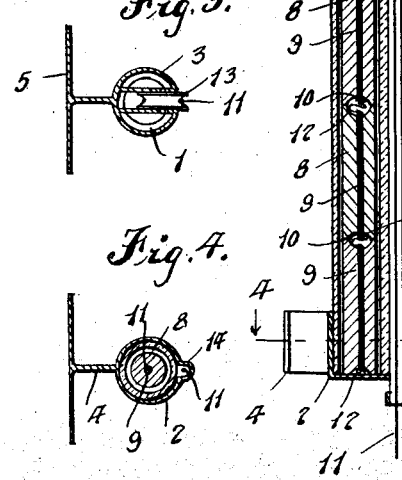
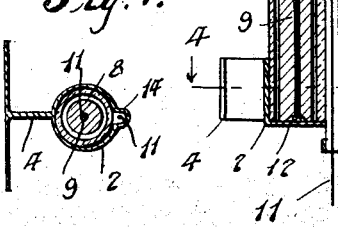
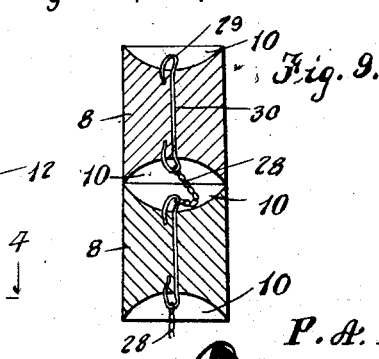
Inventor
P. A. Engle.
By
Attorney Patented Aug. 30, 1927.

1,641,070

UNITED STATES PATENT OFFICE.

PRISE A. ENGLE, OF CARLOS, INDIANA.

SCALE.

Application filed February 4, 1926. Serial No. 86,005.

This invention relates to scales, and has for one of its objects to improve and simplify the general construction of devices of this kind and to provide one that shall be especially adapted for use by post office employees, business firms and in the household, and that can be readily attached to a desk, casement, letter carrier's pouch or to the delivery vehicle of the letter carrier or business firm.

With the foregoing and other objects in view, the invention consists of the novel construction, combination and arrangement of parts hereinafter fully described and claimed, and illustrated in the accompanying drawing, wherein:

Figure 1 is a view in side elevation of a scale constructed in accordance with my invention, Figure 2 is an enlarged vertical sectional view of the scale, Figure 3 is a detail sectional view taken on the horizontal plane indicated by the line 3—3 of Figure 2, Figure 4 is a detail sectional view taken on the horizontal plane indicated by the line 4—4 of Figure 2, Figure 5 is a vertical sectional view of the upper portion of a slightly modified form of the scale, Figure 6 is a detail sectional view taken on the horizontal plane indicated by the line 6—6 of Figure 5, Figure 7 is an elevational view illustrating a slightly modified form of the tube of the scale, Figure 8 is a similar view of a further modified form of the tube of the scale, and Figure 9 is a detail sectional view illustrating a slightly modified form of the means for connecting the weights for limited actuation relatively.

Corresponding and like parts are referred to in the following description, and designated in the several views of the accompanying drawing, by similar reference characters.

The scale comprises a member which may take the form of a transparent tube 1 the ends of which are closed by caps 2 and 3. The bottom cap 2 and top cap 3 are provided with brackets 4 and 5, respectively, through the medium of which the scale may be secured to a suitable support 6 as shown in Figure 1. The support 6 may be a desk, casement, wall or the like. The tube 1 is graduated as shown at 7, and these graduations may represent ounces or fractions thereof or pounds or other units of weight. Similar weights 8 rest one upon the other in the tube 1, and the bottom weight rests upon the bottom cap 2. The weights 8 correspond in number to the graduations 7, and the upper ends of the respective weights are normally located below the respective graduations. The weights 8 are provided with axial bores 9 and with terminal recesses 10 communicating with the bores. A flexible member 11 passes through the bores 9 of the weights 8, and is knotted to provide stops 12 corresponding in number to the weights and positioned in the recesses 10 of the weights. The member 11 passes over a guide which may take the form of a grooved pulley 13 journaled in the top cap 3 and downwardly through a tube 14 carried by this cap and the bottom cap 2. A pan, hook or other suitable supporting device for the article to be weighed is to be secured to the outer or free end of the member 11.

Those portions of the flexible member 11 located between the stops 12, are each greater in length than the vertical dimension of each of the weights 8 so as to permit the weights to be successively raised through the medium of the member 11. It will thus be seen that when the article to be weighed is placed on or connected to the support attached to the member 11 one or more of the weights 8 will be raised, that the number of weights raised will depend solely on the weight of the article, and that the weight of the article is ascertained from the number of weights raised.

In Figure 5 a slightly modified form of the scale is shown. This scale differs from the one shown in Figures 1—4 in that the brackets 4 and 5 and top cap 3 are omitted and in that a handle 15 is secured to the upper end of the tube 1. This scale is especially adapted for use by letter carriers and may be removably secured to the letter carrier's pouch by means of clips, not shown. The handle 15 is secured to the upper end of the tube 1 by a sleeve 16, and the pulley 13 is journaled in the sleeve. The handle 15 is provided with an axial bore 17 which is enlarged at its upper end as shown at 18. A rod 19 is slidably mounted in the bore 17 and is held in contact with the topmost weight 8 by a spring 20. The upper end of the handle 15 is provided with an opening 21 which is of less diameter than the corresponding dimension of the enlarged portion 18 of the bore 17 and with slots 22 which communicate with the opening and the enlarged portion of the bore. A hollow plunger 23 is slidably mounted in the opening 21 and has a slidable or telescopic connection with the hollow cylindrical upper end 23 of the rod 19. The spring 20 is located within and has its ends secured to the parts 23 and 24, and the part 23 is provided with pins 25 which when in contact with the under side of the upper end of the handle 15 hold the spring 20 under sufficient tension to prevent the casual movement of the rod 19 and weights 8 with respect to the tube 1. By turning the plunger 23 until the pins 25 register with the slots 22 and thence raising it so as to carry the pins upwardly through the slots, the spring 20 is released so as to relieve the weights 8 of all restraining pressure and permit the use of the scale.

If desired, the tube may be made of metal or other suitable opaque material. When made of such material, it will either be provided with slots 26 opposite the graduations, as shown in Figure 7, or with a transparent panel 27, as shown in Figure 8, through which slots and panel the weights 8 may be seen. The tubes shown in these figures are designated 1$^a$ and 1$^b$ respectively.

As shown in Figure 9 the weights 8 may be connected for limited upward movement with respect to each other by flexible members such as chains 28 which are located in the recesses 10 and connected to the hooked ends 29 of rods 30 passing through and anchored in the weights. When this structure is employed, the flexible member 11 will be connected to the upper hooked end of that rod carried by the topmost weight 8.

It should be understood that the drawing is merely illustrative and does not pretend to give exact proportions. Furthermore, the said drawing is illustrative of a preferred construction, it being my expectation that various changes and modifications may be made without departing from the spirit and scope of the invention.

What is claimed is:—

1. A scale comprising a member, a pulley journaled on the member, weights movably supported by the member and provided with axial bores and terminal recesses communicating with the bores, a second member for supporting the article to be weighed and passing about the pulley and through the bores of the weights, and weight lifting stops carried by the second member for engaging and lifting the weights successively.

2. A scale comprising a graduated tube, weights movably mounted in the tube, a pulley journaled at the upper end of the tube, a second tube secured to the first tube, and a flexible member for supporting the article to be weighed and passing through the weights and over the pulley and through the second tube, and weight lifting stops carried by the member for engaging and lifting the weight successively.

3. A scale including a graduated tube having a closed lower end, a pulley journaled on the tube above said end thereof, weights arranged one upon the other within the tube and supported by said closed end thereof, and means connecting the weights for limited vertical movement with respect to each other and associated with the pulley and adapted to support the article to be weighed, said means permitting the weights to be successively raised with respect to the tube.

4. A scale comprising a graduated tube, weights movably mounted in the tube, a pulley journaled on the tube, a flexible member for supporting the article to be weighed and passing through the weights and about the pulley, weight lifting stops carried by the member for engaging and lifting the weights successively, and releasable means for holding the weights against movement with respect to the tube.

5. A scale comprising a graduated tube, a pulley journaled on the tube, weights movably mounted in the tube, a flexible member for supporting the article to be weighed and passing through the weights and about the pulley, weight lifting stops carried by said member for engaging and lifting the weights successively, a handle secured to the tube, and means releasably carried by the handle and cooperating with the weights to hold the latter against casual movement with respect to the tube.

6. A scale comprising a graduated tube, weights movably mounted in the tube, a pulley journaled at the upper end of the tube, a second tube secured to the first tube, and means connecting the weights for limited vertical movement with respect to each other and associated with the pulley and said second tube and adapted to support the article to be weighed, said means permitting the weights to be successively raised with respect to the tube.

In testimony whereof I affix my signature.

PRISE A. ENGLE.